US008562706B2

(12) United States Patent
Siber

(10) Patent No.: US 8,562,706 B2
(45) Date of Patent: Oct. 22, 2013

(54) AIR FILTER HAVING AN AIR FILTER HOUSING, USE OF AN AIR FILTER, METHOD FOR DESIGNING AN AIR FILTER, AND METHOD FOR OPERATING AN AIR FILTER

(75) Inventor: Ralf Siber, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 961 days.

(21) Appl. No.: 12/277,605

(22) Filed: Nov. 25, 2008

(65) Prior Publication Data
US 2009/0133371 A1 May 28, 2009

(30) Foreign Application Priority Data

Nov. 26, 2007 (DE) .......................... 10 2007 056 852

(51) Int. Cl.
B01D 50/00 (2006.01)
(52) U.S. Cl.
USPC ............................... 55/385.3; 55/495; 55/501
(58) Field of Classification Search
USPC .................................. 55/385.3, 495, 499, 501
See application file for complete search history.

(56) References Cited

U.S. PATENT DOCUMENTS 3,880,627 A * 4/1975 Morton ............................ 55/499

FOREIGN PATENT DOCUMENTS

| DE | 3336725 A1 | 4/1985 |
| DE | 10200673 A1 | 7/2003 |
| DE | 10314147 A1 | 11/2003 |
| EP | 0803387 A2 | 10/1997 |

OTHER PUBLICATIONS

German Patent Office, German Search Report for German Application No. 102007056852.7, Jun. 29, 2009.

* cited by examiner

Primary Examiner — Robert A Hopkins
(74) Attorney, Agent, or Firm — Ingrassia Fisher & Lorenz, P.C.

(57) ABSTRACT

An air filter is provided that includes, but is not limited to an air filter housing, which encloses an air filter chamber having an ambient air volume and a filtered air volume separated from the ambient air volume by a filter device. At least one interior side of the air filter housing enclosing the ambient air volume has ribs. The ambient air volume has air flowing through it in a flow direction operation of the air filter and sections of the ribs are situated parallel to this flow direction of the air and curved.

10 Claims, 3 Drawing Sheets

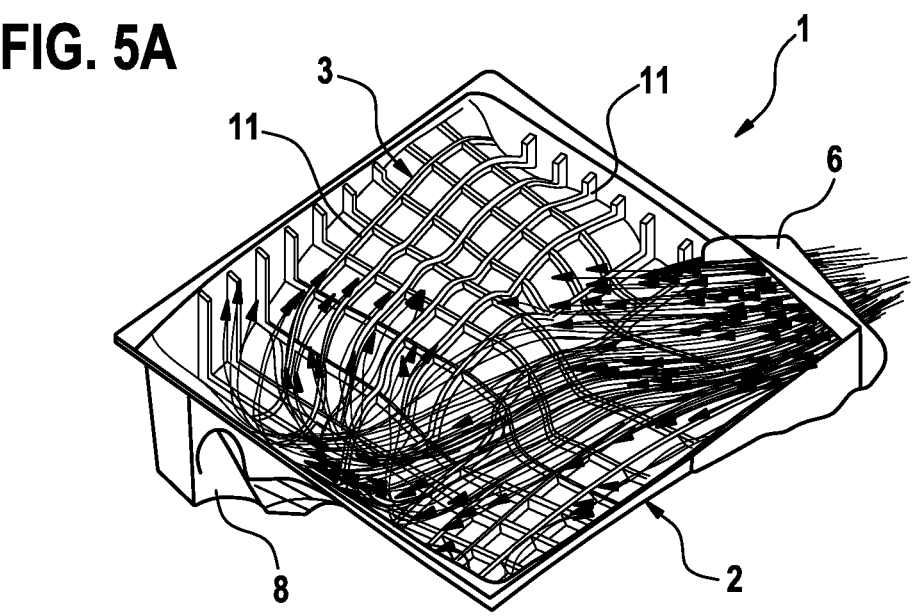
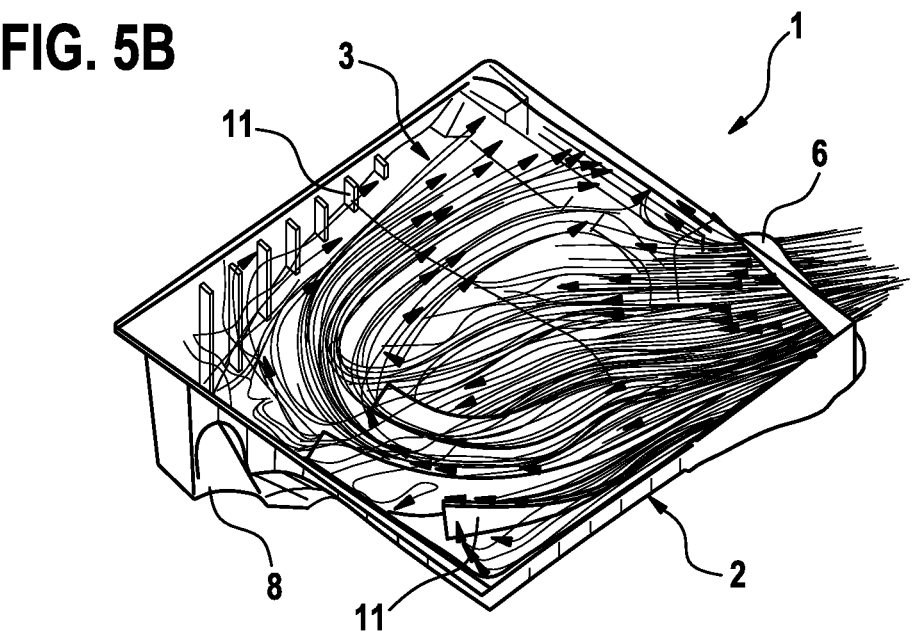

AIR FILTER HAVING AN AIR FILTER HOUSING, USE OF AN AIR FILTER, METHOD FOR DESIGNING AN AIR FILTER, AND METHOD FOR OPERATING AN AIR FILTER

CROSS-REFERENCE TO RELATED APPLICATION

This application claims priority to German Patent Application No. 102007056852.7, filed Nov. 26, 2007, which is incorporated herein by reference in its entirety.

TECHNICAL FIELD

The technical field relates to an air filter having an air filter housing, which is used for filtering processing air, as is required for material conversions, for example, in an internal combustion engine, a fuel cell, or other devices. Furthermore, the technical field relates to the use of such an air filter, a method for designing such an air filter, and a method for operating such an air filter.

BACKGROUND

Processing air is understood here and hereafter as air that is supplied in particular to a conversion process or a chemical reaction such as combustion and participates in the conversion process itself.

Air filters have the task of removing foreign particles and in particular also water from the processing air before it is fed to the conversion process. Such an air filter is known for use as a motor vehicle air filter for filtering the combustion air for an engine from DE 102 00 673 B4, for example. The interior sides of such motor vehicle air filters are typically provided with intersecting reinforcement ribs which stabilize and stiffen the air filter housing and thus reduce pulsation-induced noise emissions.

In air filters of this type, the problem frequently occurs that only a comparatively small part of the air filter volume has the intake air flowing through it at all, and this air still has a comparatively amount of moisture even after flowing through the air filter. In motor vehicles, in particular during travel in rain, this may result in functional disturbances and even a breakdown of the engine. In addition, performance losses, premature filter change, and premature replacement of the air mass sensor are to be expected.

In view of the foregoing, at least one object of the invention is therefore to specify an air filter which ensures a reliable removal of foreign particles and water from the processing air. Furthermore, a method for designing such an air filter and a method for its operation are to be specified. In addition, other objects, desirable features, and characteristics, will become apparent from the subsequent summary and detailed description, and the appended claims, taken in conjunction with the accompanying drawings and this background.

SUMMARY

This at least one object, other objects, desirable features, and characteristics, is achieved with an air filter that has an air filter housing which encloses an air filter chamber having an ambient air volume and a filtered air volume separated from the ambient air volume by a filter device. At least one interior side of the air filter housing enclosing the ambient air volume has ribs. The ambient air volume has air flowing through it in a flow section in operation of the air filter and sections of the ribs are situated parallel to this flow direction of the air and curved. The curvature of the ribs represents a curve in the plane of the interior side on which the ribs are situated. In other words, the areas in which the ribs arise on the interior side of the air filter housing and are connected thereto, form an arched curve on the interior side.

According to an embodiment of the invention, the air flow is to flow through the entire volume of the air filter as much as possible, to exploit this capacity optimally. In addition, the air flow is not to entrain particles and moisture already deposited in the filter again. The least turbulent airflow possible is therefore desirable. Turbulences arise at parts of the filter housing standing transversely to the airflow, for example, on the reinforcement ribs of the filter housing. In addition, a sudden deceleration of the air flow causes the occurrence of turbulences and also a pressure drop on the air filter, which has a negative effect on the engine performance, for example.

According to an embodiment of the invention, the reinforcement ribs, which are typically situated intersecting one another at regular intervals on the interior sides of the filter housing, are now additionally used to guide the inflowing air on a desired path and generate a circulating air flow, which passes through the entire filter volume and is comparatively less turbulent.

For this purpose, the ribs are curved at least sectionally parallel to the desired flow direction of the air. They may also additionally vary in their height over the interior side of the filter housing in such a way that they optimally support the formation of a circulating air flow, with concurrent good filter action and good stabilization of the housing.

The air filter according to an embodiment of the invention has the advantage that the inflected ribs allow a calm, less turbulent airflow through the filter volume, which additionally has a very uniform velocity distribution. Because the airflow is not continuously decelerated by transverse ribs, its velocity is comparatively high overall, which causes a lower pressure drop at the filter and thus increases the efficiency of the process.

In addition, the ribs situated parallel to the flow direction have the effect that particles and moisture are deposited on the ribs, but they are concurrently only swirled up again and returned to the airflow in small quantities because of the lack of turbulence. In addition, there is flow through the entire filter volume by the guiding of the airflow on a curved path. An optimal exploitation of the filter capacity thus results overall, which results in effective filtering of the intake processing air. Disturbances of the conversion process such as functional disturbances of an internal combustion engine by penetrating water are thus prevented and the service life of the filter and the air mass sensor is increased.

Sections of the ribs may be curved in a circle, an ellipsoid, or a spiral, depending on the shape of the filter housing, similarly arched curves are also advantageous for the shape of the ribs, which support a calm airflow having as little turbulence as possible.

The ribs are advantageously implemented as reinforcement ribs which increase a rigidity of the air filter housing. This has the advantage that the ribs may be used concurrently to reinforce the filter housing and to guide the airflow.

In an advantageous embodiment, the air filter housing enclosing the ambient air volume has a collection sink for particles entrained in the airflow. The collection sink advantageously has an outlet, through which water collected in the collection sink may be removed in particular.

It may be advantageous to situate ribs intersecting one another in the area of the collection sink, to encourage the deposition of particles and moisture. Ribs intersecting one another at least do not interfere as much in the collection sink as outside the collection sink, because the airflow partially passes over the collection sink. Particles deposited in the collection sink or entering the collection sink from other areas of the air filter are therefore also not easily swirled out again and guided back into the airflow.

The ribs advantageously do not intersect one another outside the area of the collection sink, because intersecting ribs always result in rib sections which are transverse to the airflow and thus undesirably decelerate and swirl the airflow.

A method according to the invention for designing an air filter has the following steps: firstly, an air filter housing for the air filter is modeled on the computer, the air filter housing enclosing an air filter chamber having an ambient air volume and a filtered air volume, which is separated from the ambient air volume by a filter device. At least one interior side of the modeled air filter housing enclosing the ambient air volume has ribs, sections of the ribs being situated parallel to the flow direction and curved. The airflow arising in operation is simulated at least inside the ambient air volume on the prepared model. The shape and the configurations of the ribs are optimized in such a way that the ribs both reinforce the rigidity of the air filter housing and also generate a flow field having an approximately circular flow, the largest possible component of the ambient air volume having flow through it.

A circular flow is not only understood as a flow having circular flow lines, but rather also any other flow which guides air on a comparatively regularly curved path essentially through the entire ambient air volume.

The shape and the configuration of the ribs are advantageously optimized in such a way that the deviation of the flow velocity from a mean velocity at an arbitrary location of the flow field is as small as possible. An especially uniform velocity field is generated in this way.

In a method according to the invention for operating an air filter having an air filter housing, which encloses an air filter chamber having an ambient air volume and a filtered air volume separated from the ambient air volume by a filter device, air is sucked into the ambient air volume and the airflow is guided in the ambient air volume by ribs situated curved.

In an advantageous embodiment, particles entrained by the airflow may be deposited in a collection sink of the air filter housing enclosing the ambient air volume. This is advantageous in particular for collecting moisture, because the water collected in the collection sink may be removed very easily from the air filter housing through an outlet. Such an outlet is also usable for removing particles deposited in the collection sink, however.

The air filter according to an embodiment of the invention is suitable for use as a motor vehicle air filter in a motor vehicle for filtering processing air. It is also suitable for filtering combustion air for an internal combustion engine. It is conceivable, for example, to use the air filter for filtering processing air supplied to a fuel cell or for filtering combustion air for an internal combustion engine of a motor vehicle or another machine.

BRIEF DESCRIPTION OF THE DRAWINGS

The present invention will hereinafter be described in conjunction with the following drawing figures, wherein like numerals denote like elements, and FIG. 1 schematically shows a cross-section through a motor vehicle air filter according to the prior art.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
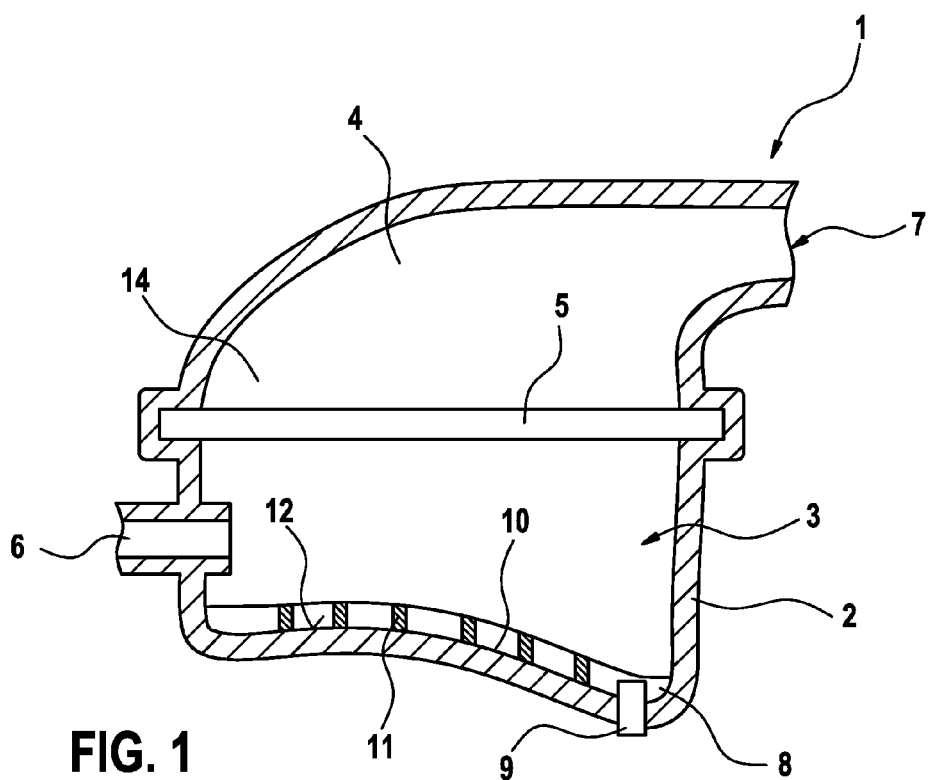

The motor vehicle air filter 1 according to the prior art shown in FIG. 1 has an air filter housing 2, which encloses an air filter chamber 14. The air filter chamber 14 is divided into an ambient air volume 3 and a filtered air volume 4, the filtered air volume 4 being connected downstream from the ambient air volume 3 in regard to the flow medium side and being separated therefrom by a filter device 5, such as a filter mat.

Air sucked in by the engine enters the filter housing through an inlet pipe 6 and exits therefrom again through an outlet pipe 7. Particles settle out of the intake air in the ambient air volume 3 in particular on the floor 12 of the filter housing 2. For example, moisture contained in the intake air condenses on the interior side 10 of the filter housing 2. The filter housing 2 typically has a collection sink 8 to collect this moisture, which is provided in the example shown with an outlet 9. The outlet 9 may have a valve (not shown), for example, through which the water collected in the collection sink 8 may be drained.

The air filter housing 2 is reinforced with ribs 11, which are situated crossing over one another on the interior sides 10 of the air filter housing 2 and in particular on the interior sides 10 of the ambient air volume 3, for stabilization and in particular for reduction of pulsation-related noise emissions. The ribs 11 are situated in the interior of the air filter housing 2 for reasons of the very limited installation space available in the motor vehicle.

Figure 2:
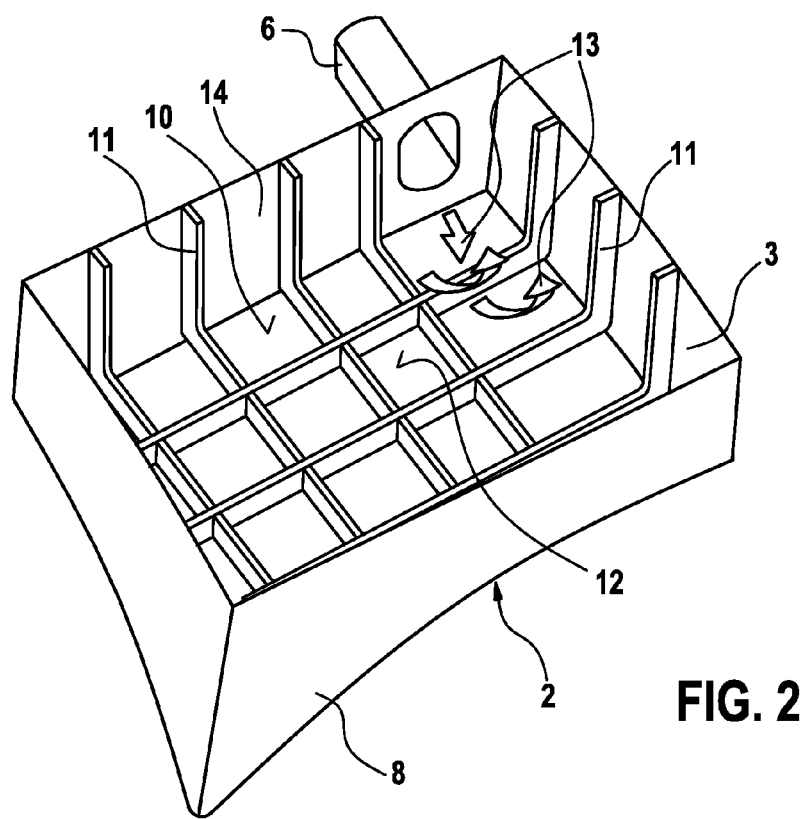
FIG. 2 schematically shows a perspective view of a part of the motor vehicle air filter according to FIG. 1.

FIG. 2 schematically shows a perspective view of the air filter housing 2 according to the prior art enclosing the ambient air volume 3. The ribs 11 are recognizable especially well, which are situated in a lattice on the interior sides 10 of the air filter housing 2 and cross over one another.

As has been shown, this known configuration has the disadvantage that the air which flows into the ambient air volume 3 in operation in one flow direction, which is schematically indicated by the arrows 13, is strongly swirled on the ribs 11, which partially stand transversely to the flow direction, so that the airflow is swirled very rapidly and deflected upward after the entry into the ambient air volume 3. The airflow is thus very strongly decelerated on one hand, which has the result that only a small part of the filter volume has flow through it at all and is exploited and a comparatively strong pressure drop occurs inside the motor vehicle air filter 1, which has a negative effect on the efficiency of the engine. The eddying also has the disadvantage that particles deposited on the ribs from the air are continuously swirled up again and returned into the airflow. In addition, the eddying also causes a strong noise development.

Figure 3:
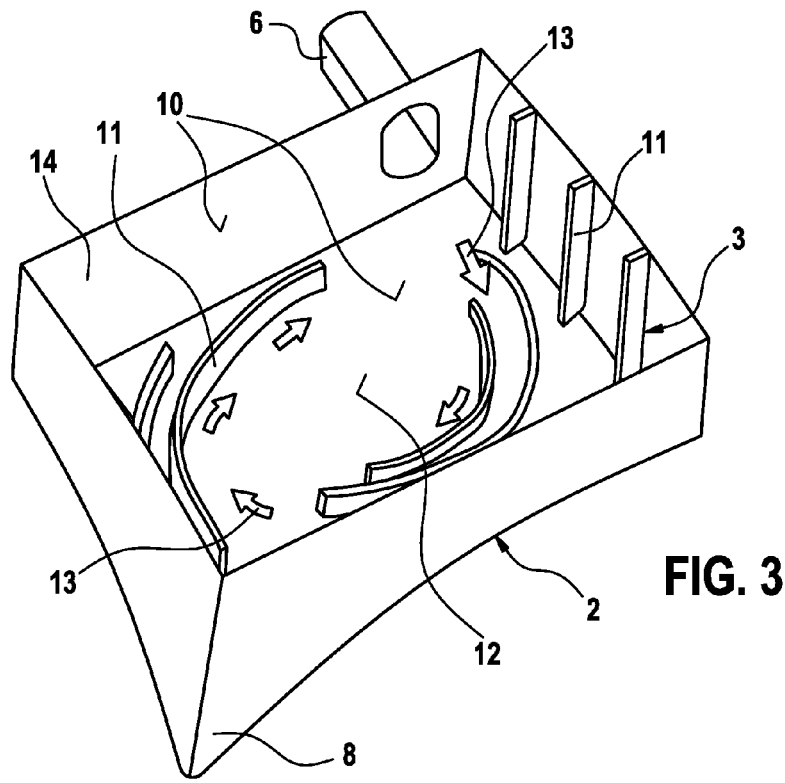
FIG. 3 schematically shows a perspective view of a part of the motor vehicle air filter according to an embodiment of the invention.

FIG. 3 schematically shows a perspective view of the air filter housing 2 enclosing the ambient air volume 3 according to an embodiment of the invention. Ribs 11 are situated on the interior side 10 of the air filter housing 2, of which only a few are schematically indicated here. The ribs 11 on the floor 12 of the air filter housing 2 are situated and shaped in such a way that they encourage and/or generate an air flows circulating in the ambient air volume 3. For this purpose, the ribs 11 are at least sectionally situated parallel to the circular flow indicated by the arrows 13 and shaped curved.

The ribs 11 are thus curved in a direction in the plane of the floor 12. They may additionally also be curved in another direction, namely where they follow the floor 12 into the collection sink 8.

Only a few ribs 11 are schematically shown in FIG. 3. In particular, numerous ribs 11 may be situated on the floor 12, which largely run parallel to one another and are curved and/or arched in the same directions.

The air entering through the inlet pipe 6 into the ambient air volume 3 is guided by the curved ribs 11 on a path which corresponds to a circular flow. The airflow is thus not decelerated by transverse ribs 11 already upon entry into the air filter housing 2, but rather it is guided on a path on which it only experiences comparatively slight velocity losses and on which it flows through nearly the entire ambient air volume 3. The ribs 11 are thus parallel to the flow direction of the air in the predominant part of their extension.

For this purpose, the ribs 11 are curved in a circle, ellipse, or spiral or adapted in another way to the shape of the air filter housing 2 and essentially guided in such a way that they do not cross over one another. In contrast, ribs 11 crossing over one another may be advantageous in the area of the collection sink 8, because in certain circumstances they encourage the deposition of particles and the condensation of moisture. In the remaining ambient air volume 3, the particles entrained in the air are deposited on the ribs 11 and flow or move partially in the direction of the collection sink 8 in the course of time.

Not only the ribs 11 on the floor 12 of the air filter housing 2 may be situated curved, but rather also the ribs 11 on the remaining interior sides 10, which may also be situated horizontally. However, the ribs 11 on the walls of the air filter housing 2 are shown as linear and vertical as in the prior art in FIG. 3. It is a function of the shape of the air filter housing 2 which ribs 11 have an especially large influence on the airflow in the ambient air volume 3 and are to be implemented as curved if necessary.

The ribs 11 fulfill two objects simultaneously according to the invention. On one hand, they stabilize and stiffen the air filter housing 2. On the other hand, through their shape and configuration, they cause a desired airflow inside the air filter housing 2. To ascertain a configuration of the ribs 11 which fulfills both objects as optimally as possible, simulations are performed according to the invention.

Figure 4A:
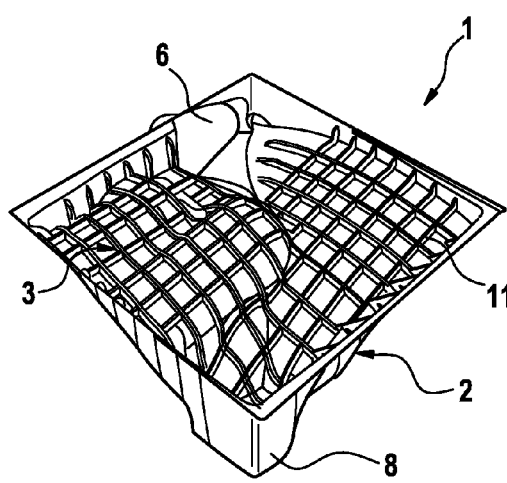
FIG. 4a and FIG. 4b shows models of a motor vehicle air filter according to according to an embodiment of the invention, and FIG. 5a and FIG. 5b shows simulation results for the operation of the model according to FIG. 4.
Figure 4B:
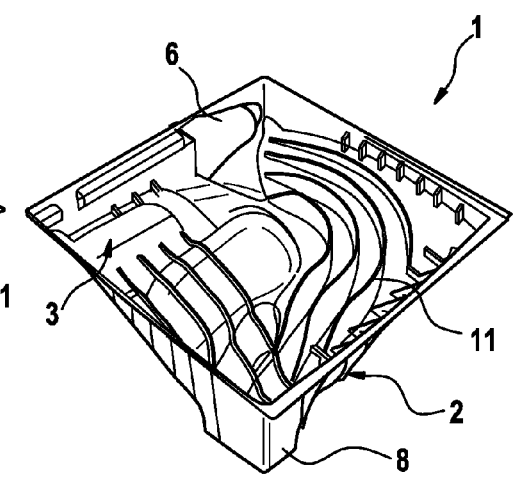

FIG. 4 and FIG. 5 show results of such simulations. FIG. 4 shows models of a motor vehicle air filter 1, FIG. 4A showing the model of a typical motor vehicle air filter 1 and FIG. 4B showing the model according to an embodiment of the invention. Correspondingly, FIG. 5A and FIG. 5B show simulation results for the operation of the models according to FIG. 4A and FIG. 4B, respectively.

While the air filter housing 2 according to the prior art shown in FIG. 4A is provided on its interior sides with ribs 11 which intersect one another at regular intervals like a lattice, the air filter housing 2 according to an embodiment of the invention shown in FIG. 4B partially has curved ribs 11 which essentially only intersect one another in the area of the collection sink 8.

It is recognizable from the simulation result in FIG. 5A how the airflow in the air filter housing 2 according to the prior art is decelerated comparatively rapidly by the transverse ribs 11 and at latest by the inner wall of the air filter housing 2 opposite to the inlet pipe 6. A significant part of the ambient air volume 3, namely that which lies to the rear in the illustration in FIG. 5A, does not have the intake air flow through it at all. As has been shown, in many air filter housings, only a quarter of the volume available has flow through it.

In contrast thereto, FIG. 5B shows that in the air filter housing 2 according to the embodiment of the invention, the airflow essentially circulates in the ambient air volume 3. The curved and comparatively tall ribs 1 behind the inlet pipe 6 cause the airflow to circulate within the ambient air volume 3 without strong deceleration, to flow through nearly the entire ambient air volume 3, and thus exploits the capacities of the air filter 1 optimally.

The simulation also has the result that the air in the air filter 1 according to an embodiment of the invention has a much more uniform velocity distribution then in the typical air filter. While the velocity of the airflow in the typical air filter decreases strongly very rapidly after the entry through the inlet pipe 6 and is nearly zero in areas of the ambient air volume 3, the ribs 11 generate an airflow having a very uniform velocity distribution overall in the ambient air volume 3.

The motor vehicle air filter 1 according to an embodiment of the invention is thus exploited especially well. In addition, only a relatively slight pressure drop occurs thereon, which has a positive effect on the engine performance.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An air filter, comprising:
an air filter housing comprising at least one interior side;
an air filter chamber enclosed by the air filter housing, the air filter chamber comprising an ambient air volume and a filtered air volume;
a filter device separating the filtered air volume from the ambient air volume; and
a plurality of ribs curved on the at least one interior side of the air filter housing, a predominant part of the plurality of ribs substantially parallel to an airflow path in the ambient air volume.

2. The air filter according to claim 1, wherein sections of the plurality of ribs are curved circularly.

3. The air filter according to claim 1, wherein sections of the plurality of ribs are curved in a spiral.

4. The air filter according to claim 1, wherein the plurality of ribs are implemented as a plurality of reinforcement ribs which increase a rigidity of the air filter housing.

5. The air filter according to claim 1, wherein the air filter housing enclosing the ambient air volume has a collection sink for particles entrained in the airflow path.

6. The air filter according to claim 5, wherein the collection sink has an outlet.

7. The air filter according to claim 5, further comprising a second plurality of ribs intersecting the plurality of ribs in an area of the collection sink.

8. The air filter according to claims 5, wherein the plurality of ribs do not intersect one another outside an area of the collection sink.

9. A method for designing an air filter, comprising the steps of:
- modeling an air filter housing for the air filter, the air filter housing enclosing an air filter chamber having an ambient air volume and a filtered air volume separated from the ambient air volume by a filter device, and at least one interior side of the air filter housing enclosing the ambient air volume having a plurality of ribs, sections of the plurality of ribs situated parallel to a flow direction and curved;
- simulating an airflow occurring in operation at least inside the ambient air volume; and
- optimizing a shape and a configuration of the plurality of ribs in such a way that the plurality of ribs both reinforce a rigidity of the air filter housing and also generate a flow field having an approximately circular flow, the largest possible proportion of the ambient air volume having flow through it.

10. The method according to claim 9, wherein the shape and the configuration of the plurality of ribs are optimized such that a deviation of a flow velocity from a mean velocity at an arbitrary location of the flow field is as small as possible.

* * * * *